N. HILL.
Whiffletree-Hook.

No. 202,649. Patented April 23, 1878.

Witnesses:
Abner Webb
Sherman Hawley

Inventor:
Nathan Hill.

UNITED STATES PATENT OFFICE.

NATHAN HILL, OF BRAVO, ASSIGNOR OF THREE-FOURTHS HIS RIGHT TO JOHN K. DIVERS, OF CLYDE, AND WILLIAM B. TRIPP, OF BANGOR, MICHIGAN.

IMPROVEMENT IN WHIFFLETREE-HOOKS.

Specification forming part of Letters Patent No. 202,649, dated April 23, 1878; application filed February 15, 1878.

*To all whom it may concern:*

Be it known that I, NATHAN HILL, of Bravo, in the county of Allegan and State of Michigan, have invented a new and useful Safety Whiffletree-Hook; and I do hereby declare that the following is a full, clear, and exact description of the construction and operation of the same, reference being had to the annexed drawings, making a part of this specification, in which—

Figure 1:
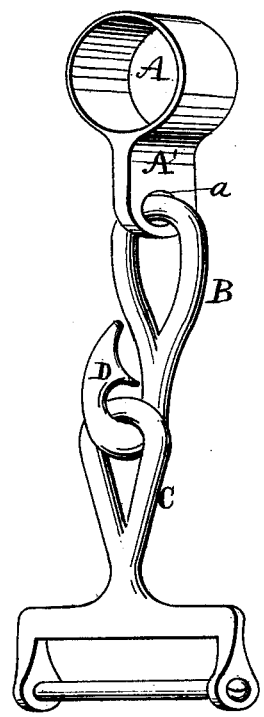
Figure 2:
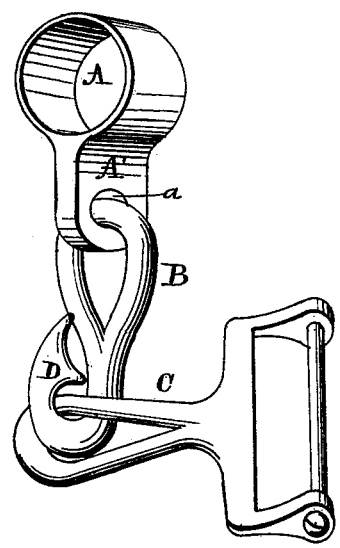

Figures 1 and 2 are views of the safety whiffletree-hook.

Letter A represents the eye of the hook to be adjusted to the ends of the whiffletree, said eye or ferrule being provided with projection A', having hole *a* for the reception of the hook B, thus forming a loose joint between the hook and ferrule. Letter B represents a catch or beard, over which to pass the trace-hook or cockeye, being made in a conical shape, and in form to conform to the shape and form of the eyes in cockeyes in general use for trace-hooks. Letter D represents a swell in the shoulder of the hook, being between the eye and the curve of the hook. The said safety whiffletree-hook is constructed of iron or other hard metallic substance, and in such form as to be adjusted to each end of whiffletrees, single or double, the swell in the shoulder extending to a point midway between the eye and the curve in the hook, and opposite the beard, lip, or catch, and is designed to prevent the cockeye or trace-hook from sliding back on the shoulder, and the consequent breaking resulting therefrom, which occurs in other whiffletree-hooks.

The lip, beard, or catch at the curve end of the whiffletree-hook is made in a conical shape, to correspond with all cockeyes and trace-hooks now used.

The part of the hook describing the curve thereof is made round and smaller than the swell of the shoulder, for the purpose of obtaining free action of the trace-hook or cockeyes between the shoulder and the beard, lip, or catch.

The beard or catch is so constructed that the part describing the upper part of a cone extends far enough above, below, or on either side of the surface of the curve to prevent the cockeye or trace-hook from unhitching or detaching itself from the whiffletree-hook, the object for which the whiffletree-hook is to be used being to determine upon which side the lip, beard, or catch shall be made.

I am aware that whiffletree attachments have been before made with the hook rigidly formed with the ferrule, and a cap formed or placed on the open end of the hook, the whole forming a solid rigid piece. Such therefore I do not claim; but What I do claim is—

The hook B, provided with projection D, in combination with the ferrule A A' *a* and cockeye C, as shown and set forth.

NATHAN HILL.

Witnesses:
   E. W. DE YOE,
   MOSES PORTER.